Oct. 21, 1969
J. M. FISHER
3,473,641
INFLATABLE ESCAPE CHUTE
Filed Oct. 23, 1967
2 Sheets-Sheet 1
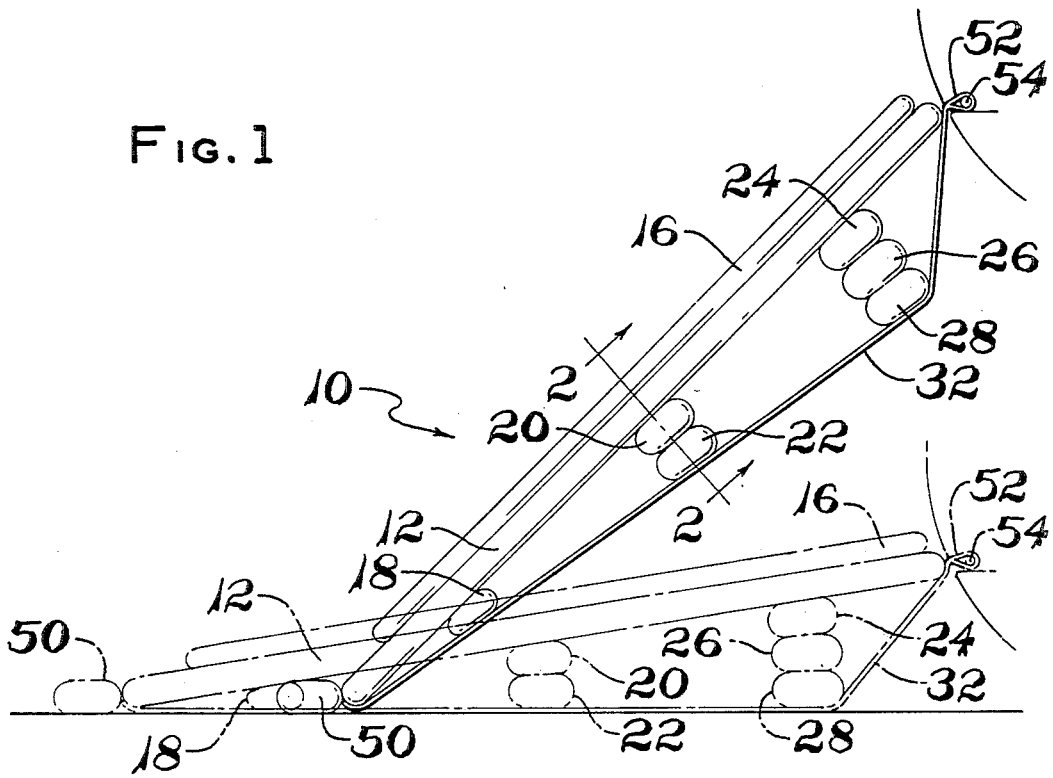
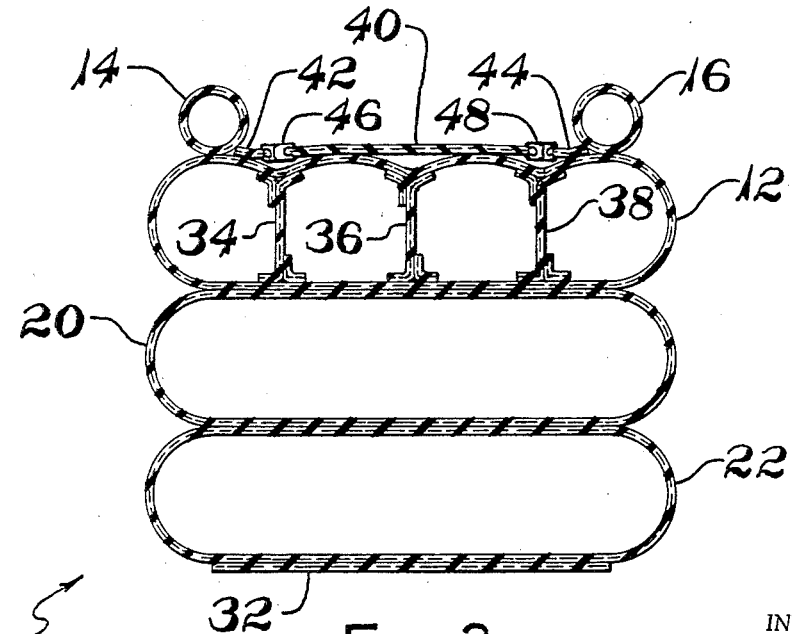
INVENTOR.
JOHN M. FISHER
BY Robert R. Yurich
ATTY.

INVENTOR.
JOHN M. FISHER
BY Robert R. Yurich
ATTY.

United States Patent Office 3,473,641
Patented Oct. 21, 1969

3,473,641
INFLATABLE ESCAPE CHUTE
John M. Fisher, Cuyahoga Falls, Ohio, assignor to The B.F. Goodrich Company, New York, N.Y., a corporation of New York
Continuation-in-part of application Ser. No. 618,574, Feb. 27, 1967. This application Oct. 23, 1967, Ser. No. 681,051
Int. Cl. B64d 25/14
U.S. Cl. 193—25    10 Claims

ABSTRACT OF THE DISCLOSURE

An improved inflatable escape chute having a wide inflatable ramp or slide member which is structurally strengthened by one or more narrow transversely extending inflatable ribs restrained against the underside of the slide member so that when the slide and rib members are fully inflated the improved chute assumes a truss-like unit capable of supporting substantial loads at any particular point along the entire length of the slide portion of the chute.

CROSS REFERENCES TO RELATED APPLICATIONS

The application is a continuation-in-part of my patent application Ser. No. 618,574, filed Feb. 27, 1967, now abandoned.

BACKGROUND OF THE INVENTION

This invention relates to inflatable escape chutes and more particularly to an improved escape chute that is especially suitable for emergency evacuation of passengers from disabled aircraft.

In the event of an aircraft emergency, such as a crash landing or crash takeoff, it is often necessary to evacuate the passengers from the aircraft as quickly as possible due to the danger of fire and explosion. In most instances, it is not possible to furnish an exterior set of stairs to permit the passengers to descend from the emergency exits in the aircraft. Therefore, it is common practice for the aircraft to contain escape chutes to permit the passenger to slide down from the exit to the ground. These escape chutes are generally stored in a folded condition at the foot of an emergency exit so that they may be readily available in the event of an emergency.

The simplest form of escape chute consists of a flexible sheet having one end attached at the foot of the emergency exit door. To form an escape slide the unattached portion of the sheet is merely dropped from the emergency door to the ground. Then, the opposite unattached end of the sheeting is held taut by two crewmen or passengers so that the sheet forms a semi-rigid slide onto which the passengers may safely descend by merely sliding down such a chute.

The most obvious disadvantage of this flexible sheet form of escape chute is that it requires that personnel first descend from the aircraft in order to be in a position for holding the unattached end of the escape chute. It was desirable, therefore, to develop a slide device that would extend from the aircraft to the ground without the requirement of ground assistance. Consequently, fluid distensible beam members have been adapted to be used as escape slides for aircraft. These inflatable type escape slides can be stored in a deflated and collapsed condition in a manner similar to the means for storing the flexible sheet type slides.

In the event of an emergency, one end of the inflatable chute is attached at the foot of the exit door and the unattached portion of the inflatable chute is dropped to the ground. Simultaneously, the chute is inflated, thereby forming a semi-rigid inflatable escape slide extending from the aircraft to the ground requiring no extra personnel at the bottom of the slide.

One form of inflatable escape chute consists generally of three parallel inflatable tubes grouped together to form a fluid-trussed beam as typically illustrated in the Boyle U.S. Patent No. 2,765,131. A second form of inflated slide consists of a series of peripheral inflatable tubes forming a rectangular frame and a fabric slideway supported by the frame between the parallel spaced longitudinal tube members as illustrated in the Hailstone patent U.S. 3,070,203.

The load bearing strength of such fluid-trussed beam slides depends on the pressure and volume of air confined. Generally, the most suitable flexible air-impermeable materials available for fabricating an inflatable chute can withstand only low internal pressures. Consequently, in order for the prior art inflatable chutes to provide sufficient load-bearing strength, it is necessary that the tubes have a relatively large cross-sectional area to assure a sufficient volume of fluid medium. An improved inflatable escape chute should materially reduce this required volume of fluid medium without an increase in pressure. With such an improved chute it would be possible to fully inflate the improved escape chute with a smaller inflation device and in less time than it takes to inflate the prior art escape chutes.

Since the normal load of a descending passenger acting on the chute increases as the angle of sliding descent decreases, it is difficult to design one particular size chute for a large range of descent angles and evacuation heights. The prior inflatable tubes are generally designed for a specific length to exit height ratio to assure a safe descent and sufficient strength in the chute to support the normal loads exerted on the chute by descending passengers. Consequently, as the exit height increases, the length of the chute must be increased thereby necessitating a longer unsupported span of chute which is more prone to failure when used. Therefore, it is desirable that an improved inflatable chute provide the means for designing a single size chute for a substantial range of descent angles and exit heights.

SUMMARY OF THE INVENTION

As the size of airliners increase to accommodate more passengers, the problems of evacuating these passengers from the airliner as quickly as possible increases substantially. More passengers must be evacuated through either more or wider emergency exits and from higher elevations. In a 500 passenger airliner, the evacuation or exit height may range from 6 ft. to 24 ft. according to the extent of the damage to the aircraft landing gears. For instance, the rear or tail exit door of the aircraft will be at its highest elevation when the aircraft nose wheel landing gears collapse. On the other hand, the lowest elevation of the tail exit door occurs when all landing gears are either collapsed or in their retracted position. It is for this extreme range of exit elevations that it is desirable to design a single inflatable chute that is capable of being used to safely evacuate passengers at all evacuation heights.

The improved inflatable chute of this invention, when fully inflated, does provide a substantially rigid escape slide with sufficient strength and rigidity to withstand the normal loads exerted on the slide over a wide range of descent angles and elevation heights. Moreover, this improved strength and rigidity is provided by an improved inflatable chute that requires a smaller volume of inflation medium than previously required by a comparably sized prior art inflatable chute.

The features of the improved inflatable chute provide an extremely stable slide surface that makes it possible for departing passengers to run or walk down the slide whenever the chute is used at the lower range of descent angles.

In evacuating passengers as quickly as possible, it may be desirable to remove two or more passengers at the same time side by side. With the inflatable chute of this invention, a wide escape slide can be provided which will permit more than a single person to slide down the chute at the same time.

The inflatable escape chute of this invention further suggests several improvement modifications for inflatable slides that provide for a certain amount of control over the evacuation speed of the passenger during his descent.

Still another important feature of this invention is a provision for a removable slide cover that protects the inflatable members of the improved chute.

According to this invention, the foregoing features are provided by an improved inflatable escape chute which includes a wide inflatable ramp portion supported by at least one transversely extending inflatable rib on the underside of the ramp with a restraining member binding the inflatable transverse rib against the inflatable ramp to form a truss-supported inflatable chute capable of sustaining substantial normal loads along the entire length of the slide portion of the chute.

BRIEF DESCRIPTION OF THE DRAWINGS

The following description and drawings illustrate two preferred inflatable escape chute constructions made according to and incorporating the embodiments of this invention.

In the drawings:

FIG. 1 is a side elevation of a multi-ribbed inflatable chute extending from the foot of an aircraft exit, shown in solid lines with the exit at its highest elevation and in phantom lines with the exit at its lowest elevation.

FIG. 2 is a cross sectional view of the inflatable escape chute of FIG. 1 on the section lines 2—2.

DESCRIPTION OF THE PREFERRED EMBODIMENTS

Figure 4:
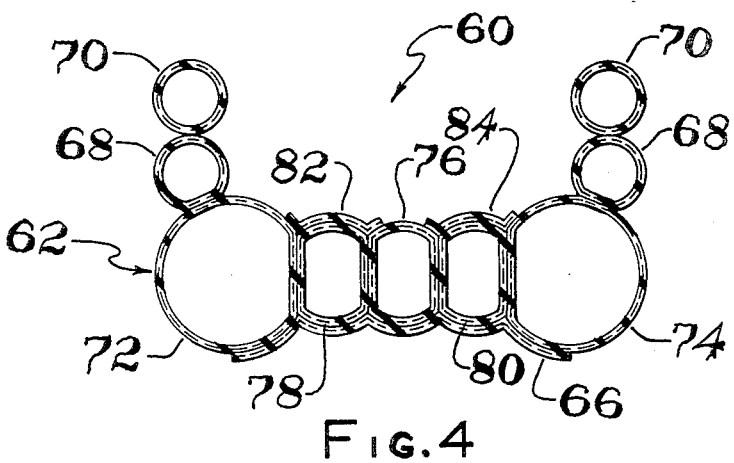
FIGS. 4 and 5 are section views of the inflatable chute of FIG. 3 along the section lines 4—4 and 5—5.

The multi-ribbed inflatable escape chute 10 shown in FIG. 1 generally consists of an inflatable ramp or slide member 12 having two inflatable guide rail bumpers 14 and 16 bonded to the upper margins of slide member 12. A series of inflatable ribs 18, 20, 22, 24, 26 and 28 are grouped and arranged on the underside of the slide member 12 in the preferred manner shown in FIG. 1. The undersides of the three distinct groupings of inflatable ribs are connected by a tension or restraining panel 32 that extends beyond the ribs to the opposite ends of the slide member 12. When the slide member 12 and all the ribs are fully inflated, this tension panel 32 restrains these distinct groupings of ribs against the underside of slide member 12 to form a generally rigid truss-like assembly.

More specifically, the ramp or slide member 12 is fabricated from an air-impervious, preferably rubber coated fabric material. The slide member 12 includes a plurality of flexible bulk heads 34, 36 and 38 extending along the inside of slide member 12. These bulk heads provide slide member 12 with a generally rectangular cross section to assure a substantially flat and stable slide surface. The use of additional bulk heads will permit the design of a wider slide member 12 and consequently a wider escape chute 10 capable of evacuating two or more passengers at the same time.

The inflatable slide member 12 further includes an interchangeable protective slide cover 40. The cover 40 is attached between two opposing tabs 42 and 44 on the upper face of slide member 12 by means of two parallel zippers 46 and 48 as shown in FIG. 2. This type of attachment permits the quick reversal or removal and replacement of cover 40. This separate cover 40 in addition to protecting the body of slide member 12 also permits the use of materials having different sliding coefficients in order to further permit custom designing of the slide construction.

An inflatable pillow bag 50 is flexibly attached to the base of slide member 12. The bag 50 has the dual purpose of cushioning the passenger's descent and positioning the passenger so that his feet are on the ground for quick departure.

The aircraft end of the slide member 12 includes an attachment strap 52 which may be formed by reversely folding an end extension of tension panel 32 as shown in FIG. 1. A long bar 54 extends through the loop of strap 52 with its opposite ends extending beyond the margins of strap 52. To attach the improved chute 10 to the aircraft, the extending portions of bar 54 are restrained at the foot of the exit door by suitable connections.

The inflatable guide rail bumpers 14 and 16 may be fabricated from the same materials used for ramp member 12. While these inflatable rails 14 and 16 do provide a degree of added strength along the length of the chute 10, the primary purpose of these tubes is to provide a handrail or guide which will prevent a person from falling off the sides of the chute 10 when they are descending.

The inflatable support ribs 18, 20, 22, 24, 26 and 28 also may be fabricated from the same materials used for the slide member 12. Variation in the number of supporting ribs and arrangement of ribs and tension panel is possible. One preferred method of arranging these support ribs and tension panel is illustrated in FIG. 1. Referring to FIG. 1, the single support rib 18 is bonded to the underside of slide member 12 near the ground level end of chute 10. Support ribs 20 and 22 are bonded to each other with rib 20 being further bonded to the underside of slide member 12 near the center of the chute 10. Similarly, ribs 24, 26 and 28 are bonded on their adjacent interfaces and rib 24 is bonded to slide member 12 near the aircraft end of chute 10. The bonding of these elements may be made with suitable adhesives which are well known to the art.

The tension panel member 32 joins the outside bases of each of the support rib groupings. In addition, one end of tension panel 32 is attached at the fixed or aircraft end of the chute and an opposite end is attached at the ground end of the chute. The tension panel member 32 illustrated in FIGS. 1 and 2 is a rectangular sheet of reinforced fabric material which may be similar to that material used in the inflatable ribs and slide member. The lower ends of rib 20, 22 and 26 are preferably bonded to the tension panel 32. It is possible to use other means for restraining the supporting ribs against slide member 12. One such method includes the use of three non-extensible parallel wires extending from one end of the chute to the opposite end of the chute with suitable connections at the base of ribs 20, 22 and 26.

It has also been found that it is possible to vary the attachment of panel member 32 to control the deflection of inflatable chute 10. For example, by attaching the ground end of tension panel 32 to slide member 12 inside the single rib 18, it is possible to assure additional deflection at the base of the slide member 12 to slow the passenger's descent.

The inflatable slide member 12 and support ribs 18, 20, 22, 24, 26 and 28 may be provided with interconnecting passages to permit the inflation of the entire chute with a single inflation device. However, to assure quicker inflation of all the inflatable elements of the chute, it may be desirable to provide several separate inflation devices at different locations. Such inflation devices are well known to the art.

In utilizing the inflatable escape chute 10 of FIG. 1, the chute 10 is folded or rolled into a relatively small package. This folded package is then stored in a hidden compartment at the base of the exit door with the attachment strap 52 and bar 54 in their attached position. In the event of an emergency, the exit door is opened and the unattached portion of the inflatable escape chute 10 is dropped from the aircraft. Simultaneously, the inflation devices are activated to communicate a suitable inflation medium into the inflatable members of the chute to inflate the escape chute 10 to its fully extended trussed-like configuration shown in FIG. 1.

The inflatable escape chute 10 shown in solid lines in FIG. 1 illustrates the approximate descending position of the chute 10 when the exit door is near its maximum elevation. In this position the passengers are evacuated by sliding down the chute.

The escape chute 10 shown in phantom in FIG. 1 illustrates the approximate position of escape chute 10 when the exit door is at its lowest elevation. At this low exit height position where the angle of descent is minimal, the bases of the support rib stacks rest fully against the ground. In this position the chute 10 has enough stability to permit a passenger to walk or run down the ramp. Therefore, in the event of an airplane crash where landing gears cannot be extended or where all landing gears have collapsed, it would be possible for the passengers to descend down the inflatable escape chute 10 by walking down the chute rather than sliding. It is also possible for the passengers to walk or run down the chute at the other low exit elevations where the ribs are not bottomed because of the excellent strength and rigidity characteristics of this improved inflatable escape chute.

Figure 3:
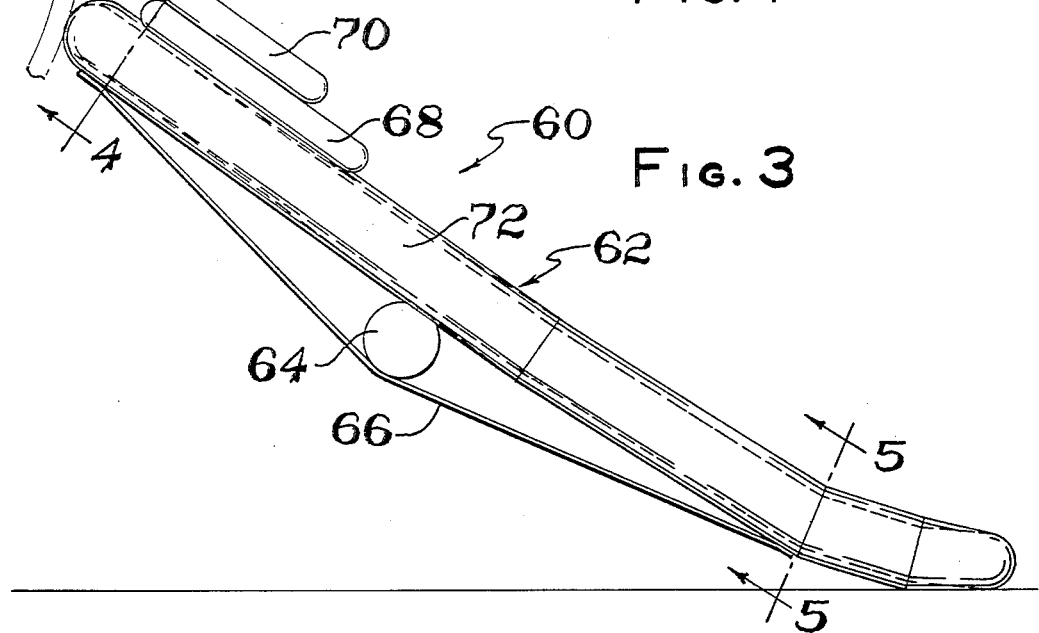
FIG. 3 is a side elevation of a single rib inflatable chute extending from the foot of an aircraft exit.

The single rib inflatable escape chute 60 shown in FIG. 3 generally includes an infiatable slideway member 62, and a transversely extending inflatable rib member 64, which is restrained against the undesired or slideway 62 by a fabric restraining panel 66. The slide member 62 further includes a pair of tubular inflatable guide rails 68 and 70 on each of the opposing edges of slideway 62, as shown in FIG. 3 and FIG. 4.

Figure 5:
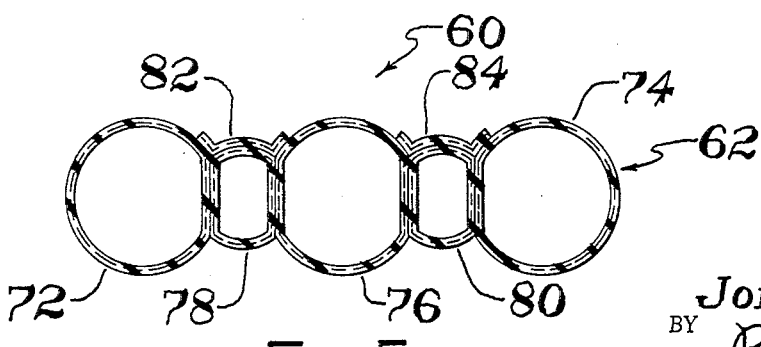

The slideway member 62 is formed of five parallel inflatable tubes preferably adhesively bonded side by side in the manner shown in FIGS. 4 and 5. These tubes are preferably fabricated from a square-woven fabric coated with a suitable air impervious rubber compound. The outer tubes 72 and 74 are of a generally uniform diameter throughout the length of slide member 62. The diameter of the center tube 76 gradually increases from a small diameter at the top of slideway 62 to a diameter approximately the same as the outer tubes 72, 74 at a point intermediate the length of slideway member 62 as shown in FIG. 1. The diameters of the remaining intermediate tubes 78 and 80 are smaller than the diameters of the outer tubes 72 and 74 and remain of uniform diameter throughout the length of slide member 62. This preferred structural configuration of slideway member 62 permits two passengers to simultaneously enter the inflatable escape chute 60 at the upper end of slideway 62 while the gradually increasing diameter center tube 76 directs the passenger over two separate slide channels formed over the tops of intermediate tubes 78 and 80. Therefore, this type of slide assembly is particularly valuable for service in the evacuation of two or more passengers at one time. Moreover, the provision of the larger diameter center tube 76 at the base of slideway member 62 provides a safe spacing between the passengers at the end of their descent where they must quickly leave the slide.

The preferred escape chute 60 further includes slide cover strips 82 and 84 over the respective intermediate tubes 78 and 80 as shown in FIGS. 4 and 5. The provision of the slide cover strips 82 and 84 protects the actual sliding area of the slideway member 62.

A further advantage of the separate slide cover strips 82 and 84 is that it is possible to design a sliding speed control into the escape chute 60. This can be accomplished by fabricating the slide cover strips 82 and 84 so that the upper sliding surfaces present a low sliding coefficient and the lower sliding surfaces a higher sliding coefficient. In such an escape chute construction the passenger's rate of descent down the chute could be generally controlled by the changing sliding coefficient of the slideway.

The transversely extending rib member 64 and the tension or restraining panel member 66 may also be fabricated from suitable air impervious rubber coated fabrics and assembled with slideway member 62 in the same manner as that described in the assembly of the mutiribbed escape chute 10.

The inflatable escape chute 60 may be attached to the aircraft body, shown in phantom, by any number of connection mechanisms including the connection arrangement shown for the multi-rib inflatable escape chute 10.

Although the present invention has been illustrated and described in connection with two preferred embodiments of the invention, it is understood that further modifications and adaptations may be made without departing from the spirit and scope of the invention.

What is claimed is:

1. An inflatable escape slide for a structure comprising an elongated inflatable ramp having an upper surface portion and a lower surface portion; said upper surface portion providing a slideway surface having sufficient strength upon inflation of said ramp to support the weight of a load carried on said slideway surface; said ramp having a cross section with a width greater than the height thereof; an inflatable member extending laterally across the width of said ramp and being attached to the under surface of said ramp intermediate the respective end portions of said ramp; said laterally extending member upon inflation having a cross section wtih one pair of sides lying in a direction transversely of said ramp and another pair of sides being generally normal to said under surface of said ramp; said another pair of sides being of a dimension that is less than said one pair of sides; an elongated tension member connected to said undersurface of said ramp close to the respective end portions of said elongated ramp; and said tension member abuttingly engaging the lower surface of said laterally extending member and cooperative with said inflatable laterally extending member and said ramp to provide a truss-like structure.

2. A slide for a structure as set forth in claim 1 wherein said ramp comprises a series of longitudinally extending bulk heads of rectangular cross section.

3. An inflatable escape chute comprising an elongated inflatable slide member having a generally rectangular cross section; a plurality of inflatable ribs supporting said slide member at predetermined longitudinally spaced locations; each of said ribs having a base portion; a longitudinally extending tension panel attached to the base of each of said inflatable ribs; and said tension panel having two opposite end portions attached to the opposite ends of said slide member to provide a truss-like structure when said slide member and ribs are inflated.

4. An escape chute according to claim 3, wherein said slide member further includes a protective cover overlying the sliding surface of said slide member and means for interchangably mounting said cover on said slide member.

5. An inflatable escape chute as set forth in claim 3 wherein said plurality of ribs include a single support rib spaced near one end of said slide member; a group of three support ribs in a plane generally normal to said slide member and located near the opposite end of said slide member; and a group of two support ribs in a plane normal to said slide member and located intermediate the length of said slide member.

6. An inflatable chute comprising a fluid distensible slideway; said slideway comprising a plurality of parallel inflatable tubes including a pair of large diameter outer tubes, two smaller diameter intermediate tubes, and a center tube between said intermediate tubes having a variable diameter that provides the slideway with two distinct slideway regions; a transversely extending inflatable rib on the underside of said slideway; and restraining means connected to the respective end portions of said slideway and to said inflatable rib on the side furthest away from said slideway to cooperate with said slideway and rib to define a truss-supported structure when said slideway and rib are fully inflated.

7. An inflatable escape chute according to claim 6 wherein said restraining means includes a fabric tension panel extending between the underside end portions of said slideway and contacting the side of said inflatable rib furthest away from said slideway.

8. An inflatable escape chute according to claim 6 wherein each of said intermediate tubes includes a separate cover strip overlying the external sliding face of said intermediate tubes.

9. An inflatable escape chute according to claim 8 wherein the sliding coefficient of said slide cover strips is greater at the lower portion of said slideway than at the upper portion of said slideway.

10. An inflatable escape slide comprising an elongated inflatable ramp having an upper surface portion and an under surface portion, said upper surface portion providing a slideway surface having sufficient strength upon inflation of said ramp to support a load carried on said slideway surface; an inflatable member attached to said under surface portion of said ramp and positioned to extend laterally from one side of said ramp to the other side of said ramp; said inflatable member upon inflation having a portion thereof projecting downwardly away from said under surface portion of said ramp; and a flexible tension member trained from a location near one end of said ramp over said downwardly projecting portion of said inflatable member to a location near the opposite end of said ramp to provide a truss, stiffening the ramp in its longitudinal direction.

References Cited
UNITED STATES PATENTS

| | | | |
|---|---|---|---|
| 3,018,867 | 1/1962 | Heyniger | 193—25 |
| 3,070,203 | 12/1962 | Hailstone | 193—25 |
| 3,102,623 | 9/1963 | Schacht et al. | 192—25 |
| 3,370,684 | 2/1968 | Holcombe | 193—25 |

ANDRES H. NIELSEN, Primary Examiner